United States Patent [19]

Gassen

[11] Patent Number: 4,792,286

[45] Date of Patent: Dec. 20, 1988

[54] BLOWER-VACUUM APPARATUS

[75] Inventor: James Gassen, Charlotte, N.C.

[73] Assignee: Textron Inc., Providence, R.I.

[21] Appl. No.: 77,109

[22] Filed: Jul. 23, 1987

[51] Int. Cl.⁴ .................. F04B 35/00; F04B 35/06
[52] U.S. Cl. .................................. 417/234; 417/364
[58] Field of Search ............................ 417/234, 364

[56] References Cited

U.S. PATENT DOCUMENTS

| | | | |
|---|---|---|---|
| 1,364,360 | 1/1921 | Emery | 417/234 |
| 1,740,918 | 12/1929 | Clarke | 417/234 |
| 3,266,428 | 8/1966 | Feith et al. | 417/234 |
| 4,288,013 | 9/1981 | Wapier | 206/145 |
| 4,318,203 | 3/1982 | Satoh | 417/364 |
| 4,601,396 | 7/1986 | Rosenthal | 206/175 |
| 4,657,477 | 4/1987 | Shinoda | 417/234 |

Primary Examiner—William L. Freeh
Attorney, Agent, or Firm—Abraham Ogman

[57] ABSTRACT

The invention is directed to an improved blower-vacuum apparatus or unity which relies on the judicious placement of the components to reduce or eliminate vibration and rotation forces thereby contributing greatly to operator comfort.

4 Claims, 3 Drawing Sheets

BLOWER-VACUUM APPARATUS

BACKGROUND

This invention is directed to an improved blower-vacuum apparatus or blower-vacuum unit. A blower-vacuum apparatus is generically a centrifugal fan driven by a power unit such as a gas engine or electric motor. Characteristically there is a volute housing containing a central air intake which can double as a vacuum input and a tangential volute outlet which doubles as blower when tubular extensions are added to the outlet or as an access to vacuum collector when a leaf bag is mounted on the tangential outlet.

The following discussion will cover a unit using a single cylinder gas engine. The invention is not limited to this type of power unit.

One of the most serious problems associated with blower-vacuum units is vibration. The tangential volute outlet is a small jet and tends to rotate the unit which rotation is resisted by the operators hand. Further the reciprocating action of the gas engine piston also tends to introduce vibration which can be quite serious if the engine is not located properly.

OBJECTS

It is an object of the invention to provide a blower-vacuum unit which avoids the limitations and disadvantages of such prior units.

It is another object of the invention to provide a blower-vacuum unit which includes the placement of parts to place the center of gravity of the unit substantially under the handle of the unit to reduce vibration and rotative forces about the handle.

Yet another object of the invention is to provide a volute opening in line with the handle to minimize rotative forces about the handle caused by the air leaving the volute opening.

Still another object of the invention is to align the power unit cylinder with the handle of the blower-vacuum unit to reduce vibration and spurious rotative movement.

SUMMARY OF THE INVENTION

In accordance with the invention there is a blower-vacuum unit which contains a two piece volute housing. One side of the housing contains a power unit and half of a handle. The other side of the housing contains a conical fan. The handle is placed over the center of gravity of the blower-vacuum unit. The axis of the tangential volute outlet is in line with the handle and passes through the handle to minimize rotative motion about the handle due to the air jet exiting the volute outlet.

BRIEF DESCRIPTION OF OF DRAWINGS

The invention will be described in more detail hereafter in conjunction with the following drawings.

DETAILED DESCRIPTION OF THE INVENTION

Figure 1:
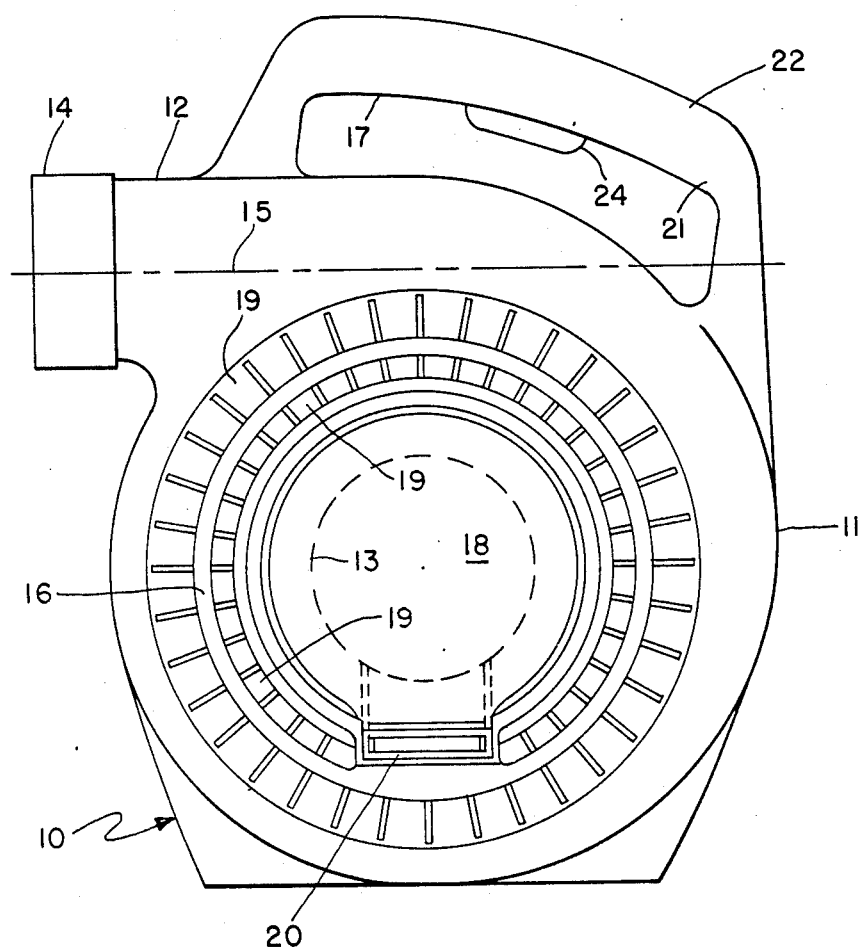
FIG. 1 is a pictorial representation of the front side of a blower-vacuum unit embodying the principles of the present invention.

Referring to FIG. 1 there is shown a front view of a blower-vacuum unit 10. Typically it contains a volute housing 12 including a volute opening 14. Also typically there is included a protective cover 16 for the intake opening 13 shown in dotted outline. The cover 16 contains a lid 18 secured to the cover 16 by a hinge 20.

At the top of the housing 12 adjacent to a rear edge 11 of the housing 12 there is a handle 22 containing a trigger 24 situated in the middle of the handle 22. The handle 22 can be operated from either of two sections each of which is designed to orient the unit properly for blowing or for vacuum operation. A rear section 21 is used to slant the volute opening 14 down for blowing. A rear section 17 works in conjunction with a second handle 23 (See FIG. 2) to pivot the blower-vacuum unit 10 about an axis 15 for vacuuming. The trigger 24 is easily operated when the hand is either the rear or front opening of the handle 22.

A multitude of openings 19 are defined in the cover 16 to permit air to enter the blower. The total area of the openings 19 is at least equal to the area of the air inlet behind the openings defined in housing 12. Preferably the total area of the openings shall be greater than the area of the central opening 13 shown in dotted outline.

The axis 15 of the volute opening 14 is generally in line with and intercepts the rear section 21 of the handle 22. The axis 15 and the volute opening are also vertically aligned with the handle 22 and the center of gravity of the apparatus depicted at 33.

Figure 2:
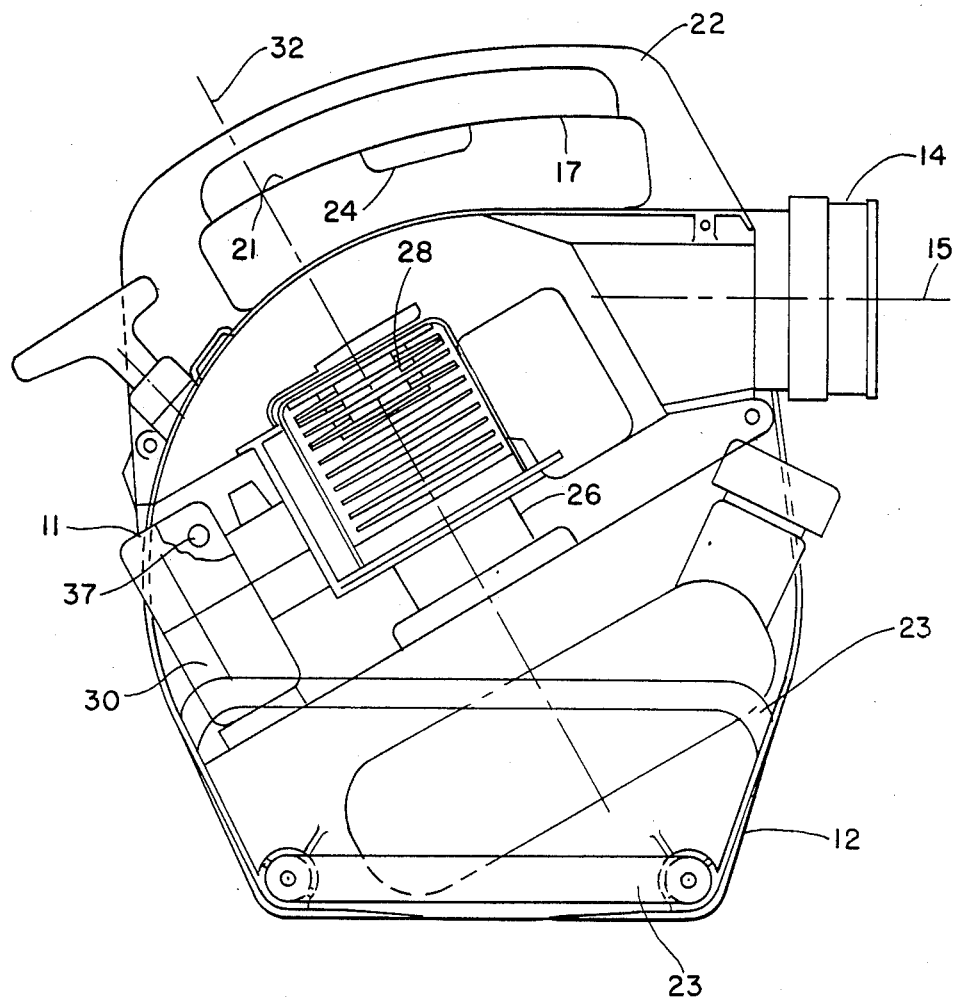
FIG. 2 is a pictorial representation of the back side of the FIG. 1 blower-vacuum unit showing the power unit placement.

FIG. 2 is the back view of the blower-vacuum unit 10 showing in particular the placement of the power unit 26 and the center of gravity with respect to the handle 22. The centerline 32 of the cylinder 28 is inclined from 50 to 70 degrees from the axis 15 of the volute opening 15. Also if the axis 32 were projected into a parallel plane of the handle or of the center of gravity 33 (see FIG. 3) it would intercept the rear section 21 of the handle 22.

The maximum shaking forces associated with the reciprocation of the single piston occurs at top dead center and at the lowest point of piston travel. Moments created by these forces about the handle 22 and the rear section 21 in particular are minimal since the distance between the axis 32 and the handle is very small. There are essentially no moment arms to creates spurious moments. The interaction with other vibration and rotation forces are also minimized.

Figure 3:
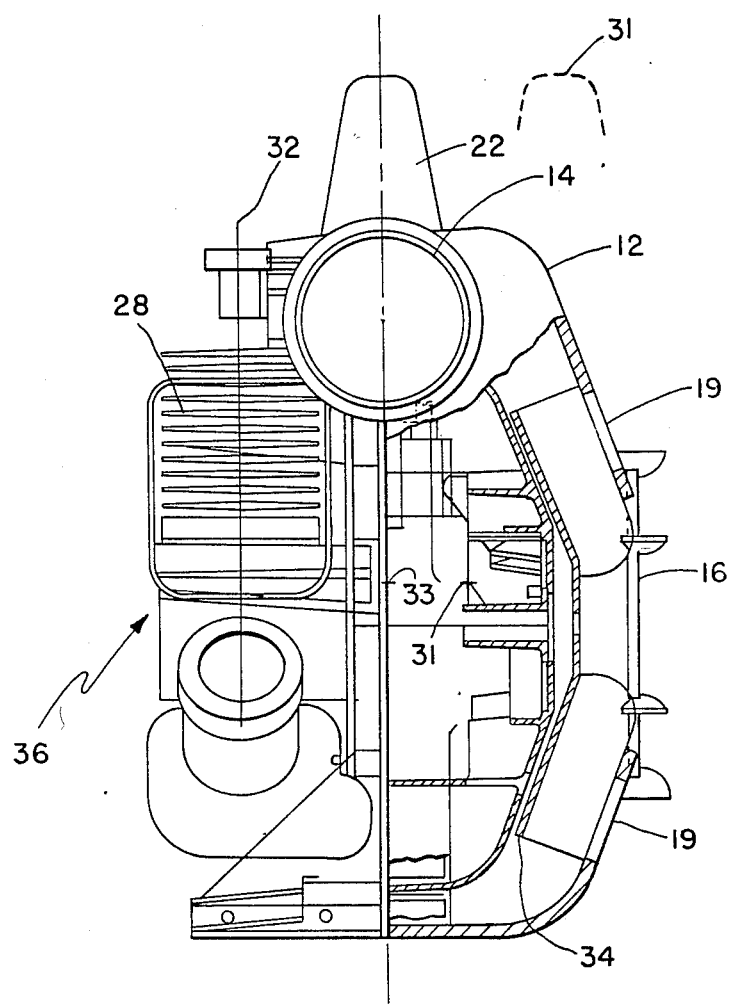
FIG. 3 is a side view of the FIG. 1 unit including a section showing the fan in section.

FIG. 3 shows a front side view of the FIG. 1 unit with the fan portion shown in section. A conical shaped fan 34 is mounted for rotation by the power unit 26. Air is sucked in through openings 19 in the cover 16 and directed though the volute housing 12 to the volute opening 14 and out of the unit.

DESCRIPTION OF THE OPERATION

An important consideration in the placement of the power unit 26 (see FIG. 3) is to locate the handle 22 over the center of gravity 33. Traditionally the power unit is heavier than the fan and ancillary components mounted on the front side of the housing. Traditionally, the handle is located to the right of the center of gravity 33 as at 31 for example. In prior units of this type the handle 22 was as much as 1.5 to 2 inches to the right of the center of gravity of the unit. There was a natural tendency for the unit to rotate counter clockwise about the handle 22 due the weight unbalance.

In addition there was is a significant moment arm between the center of the cylinder and the handle. The thrust of the piston at top dead center and at the low end of its travel creates substantial rotative forces about the handle and considerable discomfort.

In many cases the fuel tank was located under the engine similarly to the gas tank in the figures. The weight of the fuel was therefore also sufficiently off center to create rotative forces about the handle.

The center of gravity of the unit 10 was placed below the handle by moving the handle 22 and the volute opening 14 to the left from the position these had in previous models. Ordinarily with a conventional flat fan it would be necessary to increase the front to back width of the unit 10 and increase the ducting from the fan to the volute opening to accomplish this movement.

In this case the handle was moved without increasing the front to back thickness. Actually the front to back thickness was decreased by utilizing the conical fan 34.

Though the cylinder of the power unit remains off center test data indicates that a very material reduction in vibration and rotative forces was achieved . A substantial improvement in operator comfort was achieved and as was pointed out previously the conical fan performed more efficiently. In practice a more compact front to back width was achieved.

Rotative forces about the handle 22 due to the reaction from the jet of air leaving the volute opening 14 have been virtually eliminated by arranging for the axis of the volute opening 14 to pass through the rear section 21 of the handle thereby reducing or eliminating the moment arm between the axis and the hand placed in the rear section 21 that existed in prior units.

Heretofore the volute opening was directed downward from a handle located on the top of the unit by about 45 degrees. The forces created by the reaction due to the jet stream leaving the volute opening in these prior units developed rotation forces about the handle. These forces were a great cause of discomfort to the operator. Where the volute opening is parallel to the handle as shown in FIG. 2 no meaningful rotation forces are developed with the resultant improvement in operator comfort.

It will of course be understood that various changes may be made in the form, details, arrangement and proportions of the various parts without departing from the scope of the inventions.

What is claimed is:

1. A blower-vacuum unit having a volute housing including a volute opening, a power unit, a centrifugal fan and a handle on the top of the housing, the handle having a rear section adapted to receive an operator's hand, the improvement comprising:
    a tangential volute opening having an axis which passes through the rear section of the handle, said power unity having a cylinder with a cylinder axis which is inclined 50 to 70 degrees from the axis of the volute opening and when said axis is projected to intercept the handle, said axis will intercept the rear portion of the handle.

2. A unit as defined in claim 1 where the handle is substantially parallel to the axis of the volute opening.

3. A unit as defined in claim 1 where the handle is vertically aligned with the volute opening and both are situated over the center of gravity of the unit.

4. A blower-vacuum unit as defined in claim 1 where the centrifugal fan has a conical configuration and is located on the opposite side of the center of gravity from the power unit.

* * * * *